United States Patent [19]

Tokieda et al.

[11] Patent Number: 5,227,424
[45] Date of Patent: Jul. 13, 1993

[54] RUBBER COMPOSITION FOR USE AS A TIRE TREAD

[75] Inventors: Akinori Tokieda, Chigasaki; Shinji Kawakami, Hiratsuka; Yasushi Kikuchi, Odawara; Makoto Misawa, Tokyo; Yoshinori Hunayama, Isehara, all of Japan

[73] Assignee: The Yokohama Rubber Co., Ltd., Japan

[21] Appl. No.: 837,100

[22] Filed: Feb. 18, 1992

Related U.S. Application Data

[63] Continuation of Ser. No. 686,835, Apr. 17, 1991, abandoned, which is a continuation of Ser. No. 434,242, Nov. 13, 1989, abandoned.

[30] Foreign Application Priority Data

Nov. 14, 1988 [JP] Japan .................. 63-285721

[51] Int. Cl.$^5$ .................. C08K 5/01; C08K 3/04; C08L 53/02
[52] U.S. Cl. .................. 524/484; 524/485; 524/486; 524/495; 524/496; 524/505; 524/847
[58] Field of Search .............. 524/484, 485, 486, 495, 524/496, 505, 847

[56] References Cited

U.S. PATENT DOCUMENTS

| 3,795,651 | 3/1974 | Yamaguchi et al. | 524/496 |
|---|---|---|---|
| 3,795,652 | 3/1974 | Yamaguchi et al. | 524/496 |
| 4,433,094 | 2/1984 | Ogawa et al. | 524/496 |
| 4,673,709 | 6/1987 | Nordsiek | 524/505 |
| 4,732,927 | 3/1988 | Ida | 524/505 |
| 4,745,150 | 5/1988 | Ida | 524/505 |
| 4,748,168 | 5/1988 | Kawakami et al. | 524/474 |
| 4,908,401 | 3/1990 | O'Hara | 524/505 |

FOREIGN PATENT DOCUMENTS

| 54-62248 | 5/1979 | Japan . | |
|---|---|---|---|
| 57-102912 | 6/1982 | Japan . | |
| 57-108142 | 7/1982 | Japan . | |
| 57-109817 | 7/1982 | Japan . | |
| 60-192739 | 10/1985 | Japan . | |
| 1016937 | 1/1986 | Japan | 524/485 |
| 61-55135 | 3/1986 | Japan . | |
| 61-66733 | 4/1986 | Japan . | |
| 61-231016 | 10/1986 | Japan . | |
| 62-62840 | 3/1987 | Japan . | |
| 62-129327 | 6/1987 | Japan . | |

Primary Examiner—Paul R. Michl
Assistant Examiner—Peter Szekely
Attorney, Agent, or Firm—Finnegan, Henderson, Farabow, Garrett and Dunner

[57] ABSTRACT

A rubber composition for tire treads is disclosed which is designed to exhibit high resistance to skidding on wet, icy and snowy roads. A selected rubber blend of styrene-butadiene rubber and natural rubber and/or polyisoprene rubber is combined with a selected carbon black of specified specific surface areas and also with a selected softener of specified viscosity-gravity constants. The styrene-butadiene rubber consists essentially of two styrene-butadiene block copolymers each having varied styrene and vinyl contents and a specified transition temperature width, one block having a higher glass transition temperature than the other.

3 Claims, 2 Drawing Sheets

RUBBER COMPOSITION FOR USE AS A TIRE TREAD

This application is a continuation of application Ser. No. 07/686,835 filed Apr. 17, 1991 now abandoned which is a continuation of Ser. No. 07/434,242, filed Nov. 13, 1989 now abandoned.

BACKGROUND OF THE INVENTION

1. Field of the Invention

This invention is directed to a rubber composition particularly formulated for use in tread portions for automobile tires.

2. Description of the Prior Art

Automotive tires are usually required to be safe and economical to run and comfortable to ride. To cope with the advent of highway networks, tire qualities have grown more and more strict with respect to cornering and braking characteristics, at high-speed running, among many other important properties. To this end tire treads are generally formed from rubbers of high hysteresis loss associated with friction or gripping on the road surface.

Hysteresis loss is generated by periodic deformation of the tire tread while in high-speed, frictional contact with even slight undulations on the road. The more frequently the tread dissipates energy at its surface areas contacting with the road, the greater frictional force. This tread deformation is known to depend, as evidenced by the William-Landel-Fery superposition principle of temperature against time, upon the magnitude of hysteresis loss measured at a lower temperature, say in a temperature difference of 30° to 40° C., than that at which the tire is run. More specifically, the loss factor of the tread, called tan δ and taken as a measure of the hysteresis loss, has been found fairly correlative with the friction coefficient of the tire at that temperature.

To attain great hysteresis loss imparted to the tire tread, it has been proposed that certain styrene-butadiene rubbers (SBR) be used which are abundant in styrene content and hence high in glass transition temperature ($T_g$). A limited region of temperatures dominates the friction quality of the tire because rubbery material reaches a peak of tan δ in the vicinity of $T_g$ corresponding to 0° C. when the tire runs at 30° C.

In the loss factor-temperature curves emulsion-polymerized SRR rubbers tend to displace their peaks of tan δ toward a high temperature side as the styrene contents increase, providing great tan δ at the foot of the curve and at around 0° C. This leaves the problem that tan δ will depend widely upon ambient temperature and thus render tire gripping objectionably variable. Such rubbers have further drawbacks in that they show a sharp rise in elastic modulus at a low temperature side and thus fail to follow a rough road and in that on ice and snow they become wholly undeformable, leading to unacceptable cornering and braking qualities.

Rubbers of low $T_g$ temperatures, typified by butadiene rubbers (BR) of great cis contents, are known to excel in gripping at low temperature but only to an extent to invite insufficient tan δ at about 0° C. and hence inadequate gripping at high temperature.

To resolve the problems encountered with the above SBR and BR rubbers, many attempts have been made by blending SBR with BR or by adding large amounts of particulate carbon black as disclosed for instance in "The Friction of Penumatic Tyres", D.F. Moore, Elasevier Scientific Publishing Co., 1975, U.S. Pat. No. 4,748,168 and Japanese Patent Laid-Open Publication No. 62-12937.

Known SBR-BR blends are prone to get converged at a single peak in the plots of loss factor against temperature. This means that the two rubbers have their peculiar benefits offset, leading to insufficient gripping at both high and low temperatures. Too much carbon black will in most instances render the resulting rubber mix susceptible to heat buildup.

Japanese Patent Laid-Open Publication No. 61-66733 and No. 62-62840 teach incorporating a certain low-temperature plasticizer in an SBR-BR blend. This additive, though efficient in improving gripping at low temperature, is liable to markedly decline in modulus at high temperature and hence instable runnability. Such sort of dilemma is attributed primarily to the viscoelastic behaviors of SBR and BR rubbers used. Reformed rubbers of SBR and BR, therefore, have been proposed which are produced by the use of an organic lithium catalyst.

Motor vehicles are run usually in various environments. In one example roads vary in surface temperature in the order of tens of degrees. To enhance gripping over such a wide range of temperatures, tread rubber should preferably be high in temperature and broad in width at a peak of tan δ. Block polymers are known to show a broad peak of tan δ as disclosed for instance in Japanese Patent Laid-Open Publication No. 57-102912 and No. 57-109817 in which block polymers are formed to have two different SBR blocks of varying styrene and 1,2-bond contents. With peak width in view, however, these prior polymers are not broad enough to meet the above temperature range and oftentimes dependent upon the combination of blocks and thus likely to displace their peak temperatures toward a high or low temperature side. There is nothing in the latter two publications to suggest that such block polymers should be resistant to skidding on ice.

Japanese Patent Laid-Open Publication No. 54-62248 discloses that BR rubbers of high 1,2-bond contents may provide a good balance between wet gripping and rolling resistance. BR of this type is necessarily inadequate with respect to gripping at low temperature as $T_g$ is rather high.

In Japanese Patent Laid-Open Publication No. 57-109817 and No. 57-108142 there are taught SBR copolymers made up of a high $T_g$ block of SBR having a styrene content of 20 to 50% by weight and a 1,2-bond content of 40 to 75% by weight and a low $T_g$ block of SBR having a styrene content of less than 10% by weight and a 1,2-bond content of 20 to 50% by weight. Such copolymers have improved wet gripping and rolling resistance.

Japanese Patent Laid-Open Publication No. 57-102912 is directed to an SBR copolymer composed of two blocks, one block of 10 to 50% in styrene content and of 20 to 50% in 1,2-bond content and the other of 1 to 30% and of more than 60%, respectively, in similar contents. This copolymer, because of the blocks differing in solubility parameter from each other, shows two $T_g$ temperatures in an uncured state and on vulcanization becomes compatible at a single $T_g$ temperature, thus developing a broad peak in the plot of loss factor against temperature.

It is known that a broad peak of tan δ, hence a good balance among wet and icy gripping, rolling resistance and breaking strength, can be provided by taking advantage of a wide distribution of vinyl contents with a $T_g$ difference of two blocks set at above 30° C. Cited in this respect is Japanese Patent Laid-Open Publication No. 60-192739. One of those blocks is an SBR block of 10 to 80% in styrene content and of 30 to 70% in vinyl content, and the other is a BR block of less than 60% in vinyl content.

Japanese Patent Laid-Open Publication No. 61-55135 teaches balancing the properties of a block copolymer by adjusting in its weight average molecular weight-number average molecular weight ratio to 1.8 to 5.0, which copolymer appears in No. 60-192739 above. This molecular weight adjustment leads to low an absolute value of tan δ.

A copolymer, taught by Japanese Patent Laid-Open Publication No. 61-231016, is made up of three SBR blocks. Such prior copolymer, though adequate in icy and wet gripping, is still insufficient with respect to the level of quality improvement.

SUMMARY OF THE INVENTION

The present invention therefore seeks to provide rubber compositions for use in tire treads which excel in gripping over a wide range of temperatures and also in resistance to skidding on wet, icy and snowy roads, thus contributing to safe and efficient running.

As will become better understood from the following description, the invention provides a rubber composition for use in tire treads which comprises (I) 100 parts by weight of a base rubber consisting essentially of a styrene-butadiene rubber in an amount of from 50 to 90 parts by weight and either one of natural rubber and polyisoprene rubber in an amount of from 10 to 50 parts by weight, the styrene-butadiene rubber being composed of (a) a first styrene-butadiene block copolymer and (b) a second styrene-butadiene block copolymer, copolymer (a) having a styrene content of from 15 to 25 percent by weight, a glass transition temperature of from −80 to −60° C. and a transition temperature width of not greater than 12° C., copolymer (b) having a styrene content of from 20 to 50 percent by weight, a glass transition temperature of −20 to +15° C. and a transition temperature width of narrower than 12° C., copolymer (a) being defined in its glass transition temperature to be at least 60° C. higher than copolymer (b), the styrene-butadiene rubber having a total styrene content of from 20 to 35 percent by weight, a total 1,2-bond content of from 20 to 45 percent by weight and a weight average molecular weight of more than 200,000, (II) 80 to 130 parts by weight of a carbon black having a specific surface area of larger than 100 m²/g as determined by nitrogen adsorption and (III) 20 to 90 parts by weight of a petroleum softener having a viscosity-gravity constant of from 0.90 to 0.98, whereby the composition has a shear storage modulus of smaller than 500 MPa at −30° C.

DETAILED DESCRIPTION OF THE INVENTION

Figure 1:
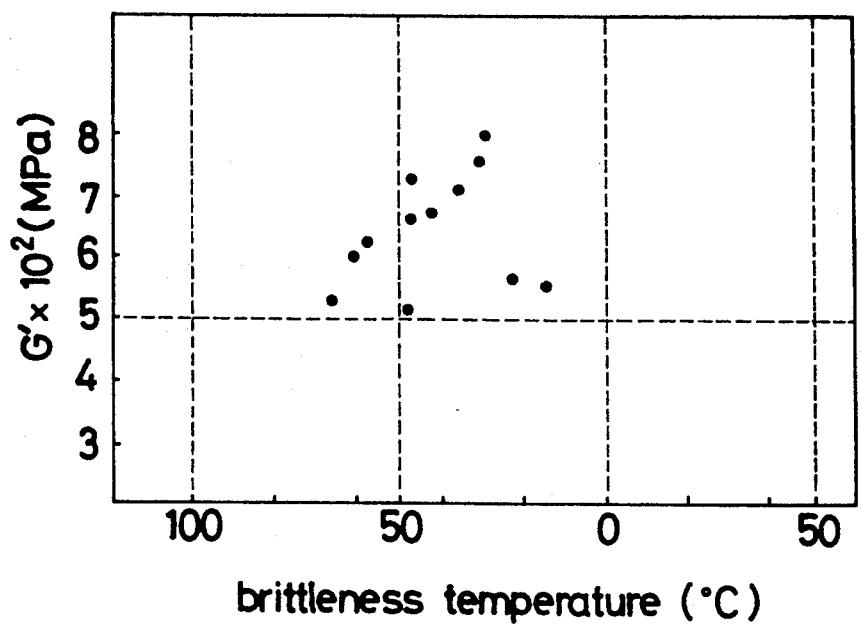
FIG. 1 is a graphic representation of different rubber compositions in the plots of the shear modulus against the brittleness temperature.

Rubber compositions contemplated under the invention are comprised of a selected base polymer, a selected carbon black and a selected petroleum softener.

The base rubber includes a block copolymer of styrene-butadiene rubber (SBR) and either one of natural rubber (NR) and polyisoprene rubber (IR), totalling at 100 parts by weight.

SBR block copolymers useful for purposes of the invention are those made up of two SBR blocks hereunder called blocks A and B. Block A is an SBR block having a styrene content of 15 to 25% by weight, a glass transition temperature ($T_g$) of −80° to −60° C. and a transition temperature width of not greater than 12° C. Block B is an SBR block of 20 to 50%, of −20° to +15° C. and of lower than 12° C., respectively, in similar parameters in that order. The whole copolymer has a total styrene content of 20 to 35%, a total 1,2-bond content of 20 to 45% and a weight average molecular weight (Mw) of greater than $20 \times 10^4$.

One important aspect of the invention resides in defining the $T_g$ difference of blocks A and B to exceed 60° C. Smaller temperature differences would make both blocks compatible and hence difficult to provide a fully broad peak of tan δ. Also importantly, blocks A and B should be lower than 12° C. in transition temperature width. In the case of narrower widths even with $T_g$ differences set at higher than 60° C., the two blocks would get compatibly converged in part but not wholly, failing to produce their respective beneficial effects.

As taught in Japanese Patent Laid-Open Publication No. 60-192739 and No. 61-55135, it has been proposed that two varying SBR blocks be copolymerized to have a $T_g$ difference of higher than 30° C. and a broad width in transition temperature, thereby attaining a broad peak of tan δ. This is due to the blocks being compatible at a single peak of tan δ upon vulcanization; that is, the blocks have their inherent properties offset as does a mere blend of two different rubbers. Such known copolymer is directed to well balancing its physical properties compared to SBR-BR blends but to an extent not to exhibit notable improvement in quality. It has now been found that strict observance of the above requirements enables SBR copolymers to be reformed, with two constituent blocks held substantially incompatible even after vulcanization.

Block B should be from −20° to +15° C. in $T_g$. Lower $T_g$ would not be effective in improving tan δ at a temperature region relative to tire gripping. Higher $T_g$ would result in a tire tread of unacceptable heat buildup and hence insufficient durability which would in turn cause severe skidding on ice and snow. The styrene content of block B should be in the range of 20 to 50%. Smaller contents would produce a copolymer block departing from the above $T_g$ range, whereas larger contents would make the resulting block excessively rich in styrene and hence abrasive and breakable. The 1,2-bond content of block B is dependent on the degree of $T_g$ and the content of styrene but preferable in the range of about 40 to 75%.

Block A should range in $T_g$ from −80° C. to −60° C. Higher $T_g$ than −60° C. would invite greater modulus at low temperature and inadequate gripping on ice and snow. To reduce Tg at below −80° C., the styrene content is necessarily less than 15% that is insufficient in regard to breaking strength. Greater styrene contents than 25% would fail to meet the Tg requirement. The 1,2-bond content of block A is preferably from 10 to 20%.

The Tg difference between blocks A and B should be higher than 60° C. Failure to observe this difference would make two blocks compatible at a single, broad peak in the tan δ-temperature curve. Such a compatible copolymer, however, is dependent in viscoelasticity upon temperature and thus desirable for instance for tires of superior rolling resistance. Rubber compositions for use in tires of an all-weather, high-performance type are required to show a broad, trapezoidal curve in the plot of tan δ against temperature. The absolute value of tan δ should also be made great as reported in "Temperature Dependency of Hysteresis Friction", J. Rubber Soc., Japan, No. 10, (1988). Blocks A and B according to the invention should thus be in incompatible or at least semi-compatible form with a Tg difference of higher than 60° C.

Blocks A and B should have a transition temperature width not exceeding 12° C. Higher transition temperatures even with Tg differences higher than 60° C. would render two companion blocks partially compatible, failing to draw a tan δ-temperature curve suitable for all-weather tires. The weight average molecular weight of the whole copolymer should be greater than $20\times10^4$ and preferably smaller than $100\times10^4$ with precessability and breaking strength in view.

The SBR copolymer according to the invention has the following physical characteristics.

1. Varying styrene and 1,2-bond contents between blocks A and B.
2. Tg differences of higher than 60° C. between blocks A and B.
3. Transition temperature widths of lower than 12° C. in each of blocks A and B.

When the final copolymer is desired to be higher in molecular weight, it is preferred that block A be used in a larger ratio. In the case where the ratios of both blocks are constant without resort to molecular weights, block A is difficult to reduce its modulus at low temperature because the molecular motion is liable to be interferred by the molecular chain of block B when frozen. As block B resumes its molecular motion at high temperature, the whole mobility becomes highly dependent on temperature, leading to a sharp decline in tan δ and hence a narrow curve.

Blocks A and B may if necessary be modified as by end grouping or coupling in conventional manner.

The block copolymers noted in connection with the foregoing publications are those directed to a good balance between rolling resistance and wet gripping, but not applied to all-weather tires. The SBR copolymer according to the invention is distinct from those prior copolymers in respect of block composition, viscoelasticity-temperature dependence and other important parameters.

The SBR block copolymer according to the invention may be produced for instance by copolymerizing a specified ratio of blocks A and B of selected styrene and 1,2-bond contents in the presence of a lithium catalyst and with the use of a hydrocarbon solvent and a polar dispersant such as ether. Reaction is feasible in a batch or continuous mode.

The copolymer thus obtained is blended with NR or IR. The latter rubber is highly efficient in rendering the resulting tire tread immune from damages such as chipping or cutting. Automotive tires are sensitive to these failures as they are likely to run not only on asphalts but also on unpavements or otherwise rough roads. Either one of NR and IR should be added in an amount of 10 to 50 parts by weight. Greater amounts than 50 parts would adversely affect the benefits of the SBR copolymer, resulting in a rubber mix of insufficient gripping.

Suitable carbon blacks should be made larger than 100 m$^2$/g in specific surface area and may be selected for example from an intermediate super abrasive furnace black (ISAF), a super abrasive furnace black (SAF) and the like. Less surface areas would invite unacceptable gripping capability and insufficient abrasion resistance. The amount of this component to be added should be in the range of 80 to 130 parts. Departures from this range would make the final rubber mix susceptible to abrasion and to heat generation and hence undesirable for use in tires of high performance.

Eligible petroleum softeners should have a viscosity-gravity constant of 0.90 to 0.98, and they include process oils of an aromatic or highly aromatic type. The softener has a role to improve processability and other qualities including riding comfort, noiselessness and braking capability. Such component if less than 0.90 in that constant would fail to give adequate gripping as does a paraffinic oil and if more than 0.98 would not act as a softening improver. The softener should range in amount from 20 to 90 parts. Smaller amounts would be responsible for processing and hence chipping and cutting. Larger amounts would make the rubber mix mechanically weak and severely abrasive.

The rubber composition of the invention should be not more than 500 MPa in shear storage modulus at −30° C. Generally, rubbery material is glassy at a temperature lower than Tg and hence brittle with the modulus beyond 100 times that at room temperature. This means that the material causes fracture even under appreciable strain. The brittleness temperature is commonly accepted in the art as a measure of the physical properties of rubber at low temperature. In the case where the modulus is less dependent on temperature as is in the rubber composition of the invention, however, the brittleness temperature is unlikely to presume simply from the magnitude of Tg. The storage moduli (G′) of different rubber mixes are plotted against the brittleness temperatures as are seen from FIG. 1. Examination of the plots shows that all the mixes exceed 500 MPa and thus grow brittle. Due to the tire being rarely used at too low a temperature, the brittleness temperature is set at −30° C.

The invention will now be described by way of the following examples which are provided for purposes of illustration only. In all formulations the numerical figures are indicated in terms of parts by weight unless otherwise noted.

Different rubber compositions were formulated as enumerated in Table 2 with the use of seven SBR rubbers composed of copolymeric blocks A and B, the physicochemical properties of these rubbers being determined in a manner to be mentioned and shown in Table 1. Two commercially available SBR rubbers were used as controls which were formed by emulsion polymerization.

The test compositions were vulcanized at 160° C. for 20 minutes into their respective rubber sheets of 2 mm in thickness. Performance evaluation was made of the vulcanizates under the conditions given below and with the results shown in Table 2.

Styrene Content

Measurement was made in accordance with Hampton's method on an IR spectrometer.

1,2-Bond Content

Morero's method was followed.

Glass Transition Temperature (Tg)

This property was determined by the temperature at which the test copolymeric rubber started extrapolating on a DuPont thermal analyzer with a temperature rise of 10° C. per minute.

Transition Temperature Width

Figure 2:
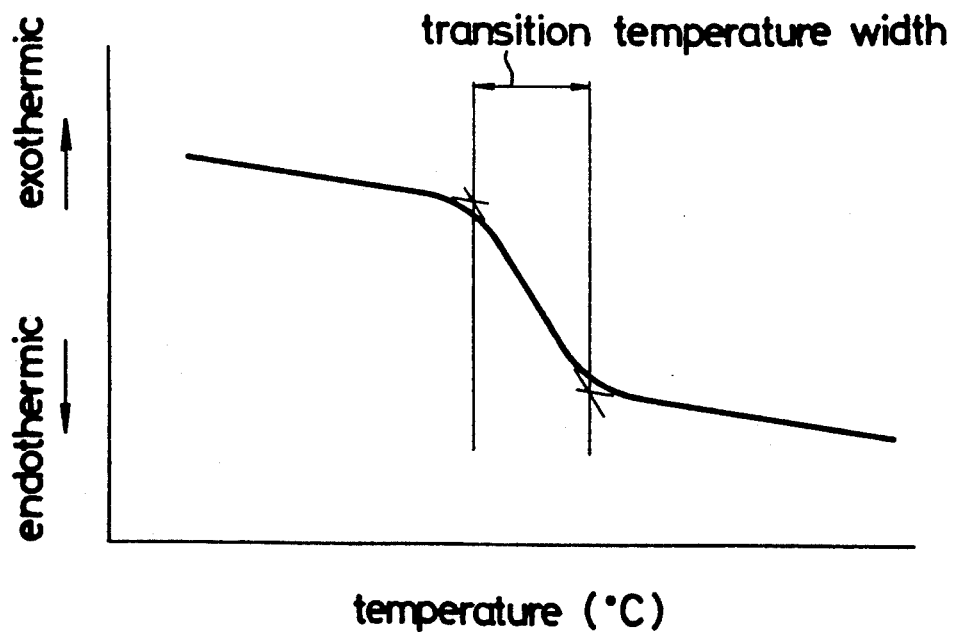
FIG. 2 is a view similar to FIG. 1 but illustrative of the transition temperature width of a block copolymer in the vicinity of the glass transition temperature, the width being determinable by differential scanning calorimetry.
Figure 3:
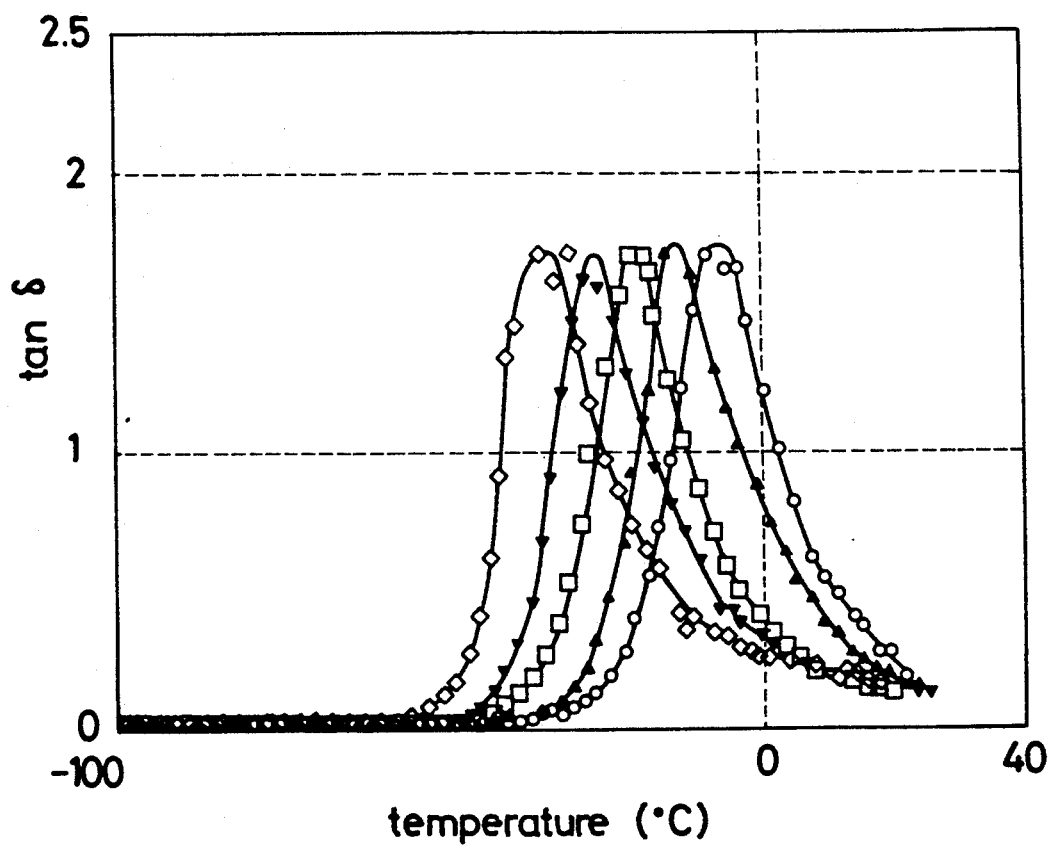
FIG. 3 is a view similar to FIG. 1 but explanatory of styrene-butadiene rubbers resulting from emulsion polymerization and having varied styrene contents in the plots of tan δ against the temperature.

Differential scanning calorimetry (DSC) was followed as shown in FIG. 2. The analyzer for Tg determination was used.

Weight Average Molecular Weight (Mw)

Calculation was done in terms of polystyrene by gel permeation chromatography (GPC).

Tensile Strength on Break ($T_B$)

JIS K-6301 was followed.

Elongation on Break (EB)

JIS K-6301 was followed.

Shear Modulus (G') at −30° C.

A viscoelasticity tester manufactured by Rheometrics Co. was used at a frequency of 20 Hz and at a shear strain of 0.5%.

Loss Factor (tan δ) at 0° C.

The method for G' was followed.

As appears clear from Table 2, the compositions representing the invention, runs 1 to 3, have proved highly satisfactory in respect of tan δ and G', i.e. noticeably antiskid on wet, icy and snowy roads, providing a good balance of the unique characteristics of the individual rubbers used.

Runs 8 and 9 were taken to test certain blends of conventional SBR with NR. Run 8 was acceptable in G' only to an extent to invite inadequate tan δ and hence objectionable wet skidding. Run 9 was just the reverse to run 8 and unacceptable in G'. In runs 5 to 7 there were used SBR rubbers made up of copolymeric blocks A and B with a Tg difference not exceeding 60° C. The latter three runs were not effective in improving resistance to wet skidding. This was due primarily to the companion blocks becoming compatible with each other, developing a broad, monomodal curve in the plot of tan δ against temperature. Departures of the total styrene content from the specified range, as evidenced by run 4, were found insufficient with respect to G'.

Various changes and modifications may be made in the above described embodiments as conceived by those skilled in the art within the scope of the appended claims.

TABLE 1

| structure | | SBR | | | | | | |
|---|---|---|---|---|---|---|---|---|
| | | A | B | C | D | E | F | G |
| block (A) | styrene content | 18 | 18 | 18 | 18 | 18 | 18 | 18 |
| | 1,2-bond content | 13 | 13 | 13 | 13 | 13 | 13 | 13 |
| | Tg | −72 | −72 | −72 | −72 | −72 | −72 | −72 |
| | transition temperature width | 7.7 | 7.7 | 7.7 | 7.7 | 7.7 | 7.7 | 7.7 |
| block (B) | styrene content | 30 | 35 | 35 | 18 | 40 | 12 | 12 |
| | 1,2-bond content | 62 | 70 | 70 | 82 | 30 | 73 | 73 |
| | Tg | −11 | 0 | 0 | −9 | −15 | −30 | −30 |
| | transition temperature width | 10.2 | 8.0 | 8.0 | 5.5 | 12.5 | 11.8 | 11.8 |
| (A)/(B) ratio | | 50/50 | 65/35 | 75/25 | 55/45 | 50/50 | 50/50 | 30/70 |
| total styrene content | | 23.7 | 24.0 | 21.9 | 18.1 | 32.2 | 16.1 | 15.0 |
| total 1,2-bond content | | 33.2 | 34.3 | 28.7 | 42.0 | 21.1 | 40.4 | 50.4 |
| Mw ($\times 10^4$) | | 24.5 | 50.2 | 45.3 | 47.7 | 76.7 | 22.9 | 23.3 |

TABLE 2

| run | 1 | 2 | 3 | 4 | 5 | 6 | 7 | 8 | 9 |
|---|---|---|---|---|---|---|---|---|---|
| A | 70 | | | | | | | | |
| B | | 70 | | | | | | | |
| C | | | 70 | | | | | | |
| D | | | | 70 | | | | | |
| E | | | | | 70 | | | | |
| F | | | | | | 70 | | | |
| G | | | | | | | 70 | | |
| NR | 30 | 30 | 30 | 30 | 30 | 30 | 30 | 30 | 30 |
| SBR[*1)] | | | | | | | | 70 | |
| SBR[*2)] | | | | | | | | | 70 |
| ISAF carbon | 95 | 95 | 95 | 95 | 95 | 95 | 95 | 95 | 95 |
| zinc oxide | 3 | 3 | 3 | 3 | 3 | 3 | 3 | 3 | 3 |
| stearic acid | 2 | 2 | 2 | 2 | 2 | 2 | 2 | 2 | 2 |
| antioxidant[*3)] | 1 | 1 | 1 | 1 | 1 | 1 | 1 | 1 | 1 |
| aromatic oil[*4)] | 50 | 50 | 50 | 50 | 50 | 50 | 50 | 50 | 50 |
| sulfur | 2 | 2 | 2 | 2 | 2 | 2 | 2 | 2 | 2 |
| accelerator[*5)] | 1.5 | 1.5 | 1.5 | 1.5 | 1.5 | 1.5 | 1.5 | 1.5 | 1.5 |
| $T_B$ | 190 | 178 | 195 | 194 | 192 | 195 | 198 | 202 | 200 |
| $E_B$ | 410 | 437 | 505 | 485 | 405 | 415 | 422 | 495 | 488 |
| G' (−30° C.) | 150 | 170 | 200 | 450 | 270 | 170 | 210 | 150 | 700 |

TABLE 2-continued

| run | 1 | 2 | 3 | 4 | 5 | 6 | 7 | 8 | 9 |
|---|---|---|---|---|---|---|---|---|---|
| tan δ (0° C.) | 0.43 | 0.42 | 0.42 | 0.35 | 0.37 | 0.35 | 0.37 | 0.35 | 0.49 |

*1)Nipol 1712, emulsion-polymerized SBR, Nippon Zeon Co.
*2)Nipol 9520, emulsion-polymerized SBR, Nippon Zeon Co.
*3)N-(1,3-dimethylbutyl)-N'-phenyl-p-phenylenediamine
*4)amount containing 37.5 parts used to extend SBR*1) or SBR*2)
*5)N-cyclohexyl-2-benzothiazollyl sulfenamide

What is claimed is:

1. A rubber composition for use in tire treads which comprises:

(I) a base rubber consisting essentially of a styrene-butadiene block copolymer rubber in an amount of 50 to 90 parts by weight and either natural rubber or polyisoprene rubber in an amount of 10 to 50 parts by weight, said base rubber totalling 100 parts by weight, said styrene-butadiene block copolymer rubber having a total styrene content of 20 to 35% by weight, a total 1, 2 bond content of 20 to 45% by weight and a weight-average molecular weight of greater than 200,000, said styrene-butadiene block copolymer rubber having (a) a first styrene-butadiene block and (b) a second styrene-butadiene block, said first block (a) having a styrene content of 15 to 25% by weight, a glass transition temperature of $-80°$ to $-60°$ C. and a transition temperature width not higher than 12° C., said second block (b) having a styrene content of 20 to 50% by weight, a glass transition temperature of $-20°$ to $+15°$ C. and a transition temperature width of lower than 12° C., said first block (a) having a glass transition temperature of at least 60° C. higher than second block (b);

(II) a carbon black having a specific surface area of more than 100 $m^2g$ as determined by nitrogen adsorption, the amount of said carbon black being in the range of 80 to 130 parts by weight per 100 parts by weight of said base rubber; and (III) a petroleum softener having a viscosity-gravity constant of 0.90 to 0.98, the amount of said petroleum softener being in the range of 20 to 90 parts by weight per 100 parts by weight of said base rubber, whereby said composition has a shear storage modulus of smaller than 500 MPa at $-30°$ C.

2. A rubber composition according to claim 1 wherein said carbon black includes an intermediate super abrasion furnace black and a super abrasion furnace black.

3. A rubber composition according to claim 1 wherein said petroleum softener is a process oil selected from the group consisting of aromatic process oils and highly aromatic process oils.

* * * * *